United States Patent Office 3,600,260
Patented Aug. 17, 1971

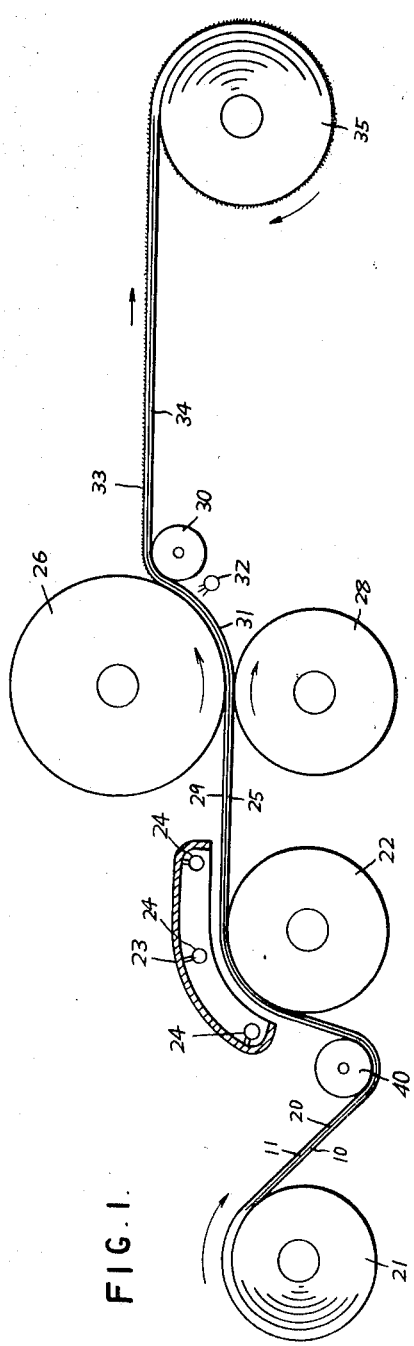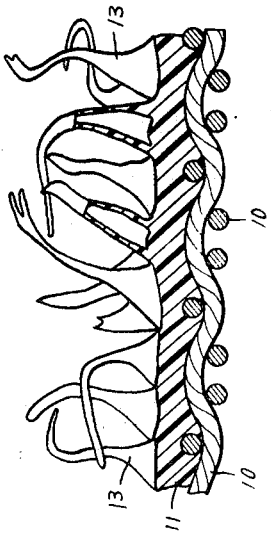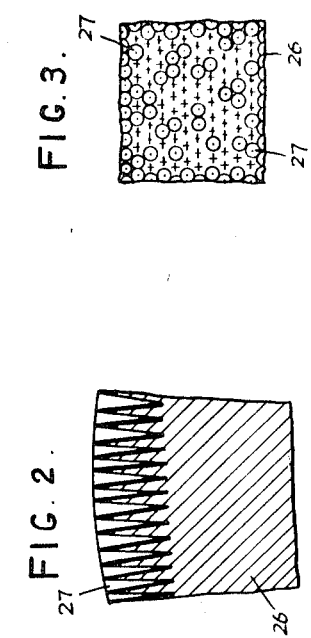

3,600,260
ARTIFICIAL LEATHER OR SUEDE-LIKE MATERIAL
Tatsuo Watanabe, 162 3-chome, Tamagawa-Okuzawa-machi, Setagaya-ku, Tokyo, Japan
Filed Feb. 2, 1967, Ser. No. 613,490
Claims priority, application Japan, June 1, 1966, 41/51,161
Int. Cl. B32b 27/12; D04h 11/00
U.S. Cl. 161—62
1 Claim

ABSTRACT OF THE DISCLOSURE

This invention relates to synthetic leather or suede-like material and to the method of manufacturing said material. The method of this invention produces a synthetic leather, one surface of which is covered with thin wavy hair-like filaments. The resultant material is soft and also warm to the touch much like suede leather or (buckskin), and is suitable for the top part of shoes or as material for handbags, and other uses where suede leather is usually employed.

---

This invention relates to the production of a synthetic leather having the appearance of suede, and being adapted for shoe uppers, handbags and other articles where suede may be used. In this invention a sheet of thermoplastic material, preferably polyvinyl chloride, is laminated to a fairly closely woven fabric backing web. The thermoplastic is heated to a temperature of 160°–180° C. to melt the outer surface thereof. The web is then continuously moved and firmly pressed against a molding drum having on its entire surface a highly multiplicity of fine substantially conical depressions 0.5 to 2.0 mm. deep and from 120 to 2000 per cm.$^2$, the sum being heated to a temperature of from 120° to 140° C. After approximately 80° of travel, the backing fabric is cooled by a spray of water at 5°–10° C. and the thermoplastic, at a temperature slightly above its softening point, is stripped from the drum. Adherence of the thermoplastic to the walls of the depressions causes stretching of the material therein before it releases. This action is uneven due to various circumstances and causes non-uniform variable distortions of the hair-like projections which are integral with the thermoplastic web. After stripping, the web is cooled in the ambient atmosphere to completely set same.

This invention is basically different from that shown in U.S. Pat. No. 3,027,595, Canadian Pat. No. 643,347, British Pat. No. 889,783, British Pats. Nos. 1,048,928 and 1,048,929. The inventions shown in the above mentioned patents have as their object, the forming of pile-like projections by means of a molding drum or a matrix, on a sheet of thermoplastic material, these projections in these cases are identical to or are nearly of the same height as the depressions in the forming drum or matrix. In the case of this invention, the object is to form wavy hair-like filaments, which are much finer than the depressions in the mold, on a thermoplastic sheet which has a cloth backing. Thus it should be clear that the method of manufacturing, and the resultant product are basically different.

One important feature of the manufacturing method of this invention lies in the fact that a thermoplastic film is applied to a continuous web of cloth to form a laminate which is stored in coil or roll form. The process for producing the thin hair-like finish is a continuous process which takes place while the original coil or roll is unwound at a constant speed and the finished product is wound up again in coil or roll form. Thus the whole process takes place continuously without intermittent stoppages.

Another important feature of the manufacturing process is that the thermoplastic film which forms the top surface of the laminate is heated until it is in a molten state after which it is pressed against a molding drum which has fine tapered depressions covering its whole surface. The thermoplastic material which is pressed into the aforementioned depressions is made to adhere to the sides of the depressions by applying suitable force to the thermoplastic and the molding drum.

Another important feature of the manufacturing process is that after the thermoplastic film which forms the surface of the laminate is heated and is in a molten state and is pressed into the depressions in the molding drum surface, cold water is sprayed on to the back of the laminate which cools the film so that it hardens and sets and adheres firmly to the backing cloth. The thermoplastic material lightly bonded to the walls of the fine substantially conical depressions in the drum mold is withdrawn from the depressions when the temperature is lowered to a point a little above the softening point of the thermoplastic. In stripping the laminate from the drum at this suitable temperature, hair-like filaments emerge from the fine substantially conical depressions and densely cover the surface of the laminate. These hair-like filaments are of varied thickness when withdrawn from the side walls of the fine depressions during the stripping and, therefore, when the filaments solidify on cooling in the atmosphere, they tend to curl or take a wave-like form.

The product resulting from the above described manufacturing process has fine wavy hair-like filaments densely covering the surface of the cloth-backed thermoplastic film, and is soft and warm to the touch in a manner similar to the feel of suede leather. This artificial leather can be used for the tops of shoes or as material for handbags, and for other purposes where suede leather may be used. The cloth backing permits easy handling when sewing or cementing the leather. The cloth tends to give a firmness to the leatherette and prevents creasing and wrinkling of the material.

These and other features of this invention will be best understood and appreciated from the following description of a preferred manner of carrying out the process as suggested in the accompanying drawings in which:

FIG. 1 is a flow diagram of the basic manufacturing equipment for producing the basic product of this invention;

FIG. 2 is a fragmentary vertical section of a portion of the molding drum;

FIG. 3 is a fragmentary plan view of a portion of the molding drum; and

FIG. 4 is a section through the basic product magnified to twenty times its original size.

The thickness of the laminate is not critical in the case of this novel process which comprises a part of this invention.

The cloth backing should have a mesh size which will retain the thermoplastic film when in a molten state, furthermore the cloth should not char when heated to approximately 250° C., and should retain its physical strength.

The thermoplastic film material can be of various kinds, such as PVC (polyvinyl chloride), polyethylene, and polyvinylalcohol, for instance PVC would be a representative type of plastic. The thickness of the film is held between 0.3 to 2 mm. the most suitable thickness is from 0.5 to 1 mm. The width of the thermoplastic film is determined by the effective length of the molding drum. The thermoplastic film which is received in roll form as a finished product, is heated to approximately 130° C. to 150° C. and is laminated with a suitable cloth by rolling between a roller heated to 130° C. to 150° C. and a pressure roller, and the plastic-cloth laminate is cooled and then coiled.

The PVC film is composed of the following:

| | Parts by weight |
|---|---|
| PVC resin | 80–120 |
| Di-octyl phthalate | 60–100 |
| Stabilizing agent | 2–3 |
| Coloring | 2–3 |

The most suitable composition is as follows:

| | Parts by weight |
|---|---|
| PVC resin | 100 |
| Di-octyl phthalate | 80 |
| Stabilizing agent | 2 |
| Coloring | 2 |

The basic manufacturing process for this invention is described in FIGS. 1, 2 and 3.

A laminate 20 of PVC film 11 on a cloth backing 10 is wound to form coil or roll 21. The laminate 20 is unwound from coil 21 at a speed of 1 to 2 meters per minute passing under idler roller 40. Pre-heating roller 22 supports the cloth 10, while radiant heat from heater 23, which includes electric heaters 24 is directed on film 11 to heat said film to 160–180° C. thus melting the film surface. The laminate 25 is pressed between molding drum 26 which is heated by super-heated steam to 120–140° C. and rubber pressure roller 28 which has a Shore durometer hardness 30–40. The melted thermoplastic film 29 is firmly pressed against the molding drum 26. The melted film enters the fine depressions 27 formed in the surface of the molding drum by hammering fine needles into the surface and removing them. The depressions 27 thus formed have a depth from 0.5–2.0 mm. the diameter at the surface being 0.3–1 mm. the density of the depressions being 2000–120 depressions/cm.² The most satisfactory product was obtained from the following: Depression depth 0.7–1.2 mm., depression diameter 0.35–0.5 mm., depression density 1000–400 depressions/cm.².

Guide roller 30 is located adjacent the periphery of the molding drum 26 at a point approximately 80° from the point where molding drum 26 is tangent to the pressure roller 28. The laminate adheres to the molding drum 26 till it passes guide roller 30, at this point the laminate 31 is stripped from the molding drum 26. Cold water sprayed from perforated pipe 32 which is located below guide roller 30 serves to cool the back surface of the laminate. The temperature of the water is held at 5–10° C., and the volume of water is 5–10 litres per minute. The temperature of the film which is stripped from the molding drum 26 should be 50–70° C. The PVC which has entered the depressions should be withdrawn at a temperature which is not too much higher than the softening temperature of the PVC which is 80–90° C. By the above described cooling process, the film 29 solidifies, and adheres firmly to the cloth backing 10. Thus when the laminate is stripped from the molding drum 26 there is no problem of the film 29 parting from the cloth 10. The PVC which is pressed into the depressions 27 adheres to the walls of the depressions 27 and since the temperature is held at 80–90° C. the plastic is elongated to form hair-like filaments 33 when it is withdrawn from the needle-shaped depressions 27. The adherence of the plastic to the walls of the depressions 27 differs according to the heating and cooling condition of the molding drum as well as the cooling condition of the laminate and also according to the shape and diameter of depressions 27. Thus when the plastic is withdrawn, the hair-like filaments will all differ in length, the length being from 1.5–3 times the depth of the substantially conical depressions 27. Also since the adherence of the plastic to the walls of the depressions 27 differs and furthermore since the PVC is non-homogeneous in composition, the plastic will be withdrawn in an uneven manner. This results in the wave-like finish on the filaments. Another factor causing further waviness is the uneven stresses which develop in the material when the filaments cool in the atmosphere and shrink.

The hair-like filaments 13 as shown in FIG. 4 are permanent. Some of the filaments are hollow inside, and some of the filaments are branched. The reason for these types of filaments being formed is still unknown at this time.

The finished laminate 34 is wound into coil or roll 35 and is stored and transported in this form. The coil is unwound, and the laminate cut to convenient sizes as required to form the tops of shoes or the material for handbags, or for other uses where suede leather may be employed.

I claim:
1. A suede-like artificial leather comprising a laminated structure consisting of a fabric backing web, a web of thermoplastic material having one face firmly united to one face of said fabric web, the other face of said thermoplastic web comprising a high multiplicity of minute, non-uniform variably distorted hair-like filaments integral therewith extending along meandering intersecting axes, the thickness of the thermoplastic web being from about 0.3 to about 2 mm., and the length of the hair-like filaments varying from about 0.75 to 3 mm. to about 1.5 to 6 mm., some of the filaments being hollow and others of the filaments having branched ends.

References Cited

UNITED STATES PATENTS

| 3,027,595 | 3/1962 | Takai et al. | 18—10 |
| 3,141,051 | 7/1964 | Takai | 264—219 |
| 3,152,002 | 10/1964 | Wisotzky et al. | 117—21 |
| 3,235,438 | 2/1966 | Wisotzky | 161—62 |
| 3,312,583 | 4/1967 | Rochlis | 161—62 |
| 3,317,644 | 2/1967 | Takai | 161—62X |
| 3,390,403 | 6/1968 | Van Tilburg | 161—67 |

ROBERT F. BURNETT, Primary Examiner

R. L. MAY, Assistant Examiner

U.S. Cl. X.R.

156—220; 264—246